(12) United States Patent
Linsenmeier et al.

(10) Patent No.: US 6,217,112 B1
(45) Date of Patent: Apr. 17, 2001

(54) MOTOR VEHICLE SEAT BENCH WITH MIDDLE ARM REST AND HEAD

(75) Inventors: Gerhard Linsenmeier, Wollbach; Walter Mehling, Veitshöchheim; Georg Fleischer, Würzburg, all of (DE)

(73) Assignee: F. S. Fehrer GmbH & Co. KG (DE)

( * ) Notice: Subject to any disclaimer, the term of this patent is extended or adjusted under 35 U.S.C. 154(b) by 0 days.

(21) Appl. No.: 09/308,004

(22) PCT Filed: Nov. 11, 1997

(86) PCT No.: PCT/DE97/02633

§ 371 Date: May 10, 1999

§ 102(e) Date: May 10, 1999

(87) PCT Pub. No.: WO98/21065

PCT Pub. Date: May 22, 1998

(30) Foreign Application Priority Data

Nov. 11, 1996 (DE) ................................ 296 19 478
Jan. 12, 1997 (DE) ................................ 297 00 979

(51) Int. Cl.$^7$ ........................................................ A47C 13/00
(52) U.S. Cl. ................. 297/113; 297/115; 297/188.19; 297/217.3
(58) Field of Search .................. 297/411.2, 112, 297/113, 115, 188.01, 391, 188.16, 188.19, 217.3, 217.4

(56) References Cited

U.S. PATENT DOCUMENTS

| 3,449,011 | 6/1969 | Edwards et al. . |
| 3,615,118 | 10/1971 | Buxton . |
| 4,533,175 | * 8/1985 | Brennan . |
| 5,096,152 | * 3/1992 | Christiansen . |
| 5,375,907 | * 12/1994 | Rogers et al. . |
| 5,433,503 | * 7/1995 | De Filippo . |

FOREIGN PATENT DOCUMENTS

| 40 15 872 C1 | 1/1992 | (DE) . |
| 42 25 880 A1 | 2/1993 | (DE) . |
| 0 604 375 A1 | 6/1994 | (EP) . |
| 0 730 993 A1 | 9/1996 | (EP) . |
| 2080947 | 11/1971 | (FR) . |
| 58-128942 | 8/1983 | (JP) . |
| 61-208982 | 9/1986 | (JP) . |

* cited by examiner

Primary Examiner—Milton Nelson, Jr.
(74) Attorney, Agent, or Firm—McGlew and Tuttle, P.C.

(57) ABSTRACT

A vehicle bench seat is proposed which includes a seat surface and back rest as well as a middle arm rest. The middle arm rest is capable of swiveling between a substantially horizontal position parallel to the seat surface and a substantially vertical position, in which it is disposed in a recess of the back rest. The middle arm rest has at its front end a head rest, which in the vertical position of the arm rest projects above the top edge of the back rest. The head rest (5) has a recess (8) at the side which forms the top side when the middle arm rest (6) is horizontally aligned.

15 Claims, 4 Drawing Sheets

MOTOR VEHICLE SEAT BENCH WITH MIDDLE ARM REST AND HEAD

FIELD OF THE INVENTION

The invention relates to a vehicle bench seat comprising a seat surface and back rest as well as a middle arm rest, which is capable of swivelling between a substantially horizontal position parallel to the seat surface and a substantially vertical position, in which it is disposed in a recess of the back rest, and has at its front end a head rest, which in the vertical position of the arm rest projects above the top edge of the back rest.

BACKGROUND OF THE INVENTION

Vehicle bench seats, in particular the bench seat of a passenger car, are mostly intended for use by up to three passengers although the middle location often remains unoccupied. For the comfort of the passengers sitting in the outer locations, it is customary to provide a middle arm rest which may be aligned substantially parallel to the upholstered seat surface and in said position often rests on the latter. When the middle location is also occupied, the arm rest may be swivelled into a substantially vertical position, in which it is disposed in a recess of the back rest of the bench seat, resulting in a substantially flat back rest and also allowing a passenger to sit comfortably in the middle of the bench. The arm rest is therefore preferably upholstered on all sides.

To guarantee adequate safety also at the middle location in the event of an accident, a head rest at the top edge of the back rest is required. On the other hand, the head rest obstructs the rear field of vision of the driver and is preferably removable when the middle location is unoccupied. It was therefore proposed in publication EP 0 604 375 to form or attach the head rest onto the front end of the middle arm rest. In such a manner, in the vertical position of the arm rest the head rest projects above the top edge of the back rest and is therefore in a suitable position to protect the passenger. When the middle location is unoccupied, however, the head rest is folded down with the arm rest towards the seat surface and therefore does not obstruct the field of vision of the driver. To achieve an adaptation to the height of the occupant, it is known for the head rest to be extendable out of the arm rest or—in the case of an integral style of construction—displaceable up and down with the arm rest when in the vertical position.

It is moreover customary in many cases for a middle arm rest to be used as a storage compartment or provided with areas where articles may be placed or deposited. In particular, cup and drinks can holders, ashtrays or oddments trays are often fastened to the front end of the arm rest. When not in use, they may be inserted into the arm rest to eliminate risks of injury and avoid clutter. When the front-end region of the middle arm rest is used as a head rest, however, such prior art devices are not usable because the padding of the head rest almost totally takes up the volume of the arm rest required for accommodation.

SUMMARY AND OBJECTS OF THE INVENTION

The primary object of the invention is to develop a vehicle bench seat having a middle arm rest and a head rest fastened to the middle arm rest, wherein useful compartments or surfaces are provided in the region of the head rest.

The object is achieved according to the invention in that the head rest has a recess at the side which forms the top side when the middle arm rest is horizontally aligned.

The central idea of the invention is to provide storage compartments and deposit surfaces only in the part of the head rest which forms the top side when the arm rest is horizontally aligned, i.e., the part which in the working position of the head rest faces towards the back of the vehicle. To achieve this result, the head rest has, at the top side of the arm rest, a recess which is preferably accessible from the top side or front end of the arm rest. There is therefore sufficient room left to accommodate the padding of the head rest. The recess may be used to store many different articles, e.g., a make-up bag, writing instruments, smoker's requisites or a headset. Preferably, the recess comprises holders, in which the appropriate articles may be secured so that they remain in position, particularly in the event of an accident. In the case of larger articles, such as a headset, the recess may consist exclusively of the holder. It is also conceivable to design the recess as a deposit surface which may be used for a wide variety of articles.

The advantage of the proposed invention lies in the provision in the vehicle interior of an additional, easily accessible storage or useful compartment. At the same time, both the equipment of the middle location with a head rest and the swivelling ability of the arm rest with the head rest attached thereto are retained.

In an advantageous development of the invention, the recess is closable, preferably by means of a roller blind or lid. In said manner, the contents of the recess are fixed in position and, particularly in the event of an accident, the risk of injury from flying articles or as a result of impact with hard inner surfaces of the recess is avoided. The visual appearance of the head rest is also enhanced in said manner. The outside of the roller blind or lid may be provided with a covering and, optionally, a thin layer of padding.

A lid is advantageously capable of swivelling about an axis at the edge of the recess, wherein the point at which the axis is provided is preferably the edge of the recess which is situated—in a travel direction—at the front when the arm rest is folded down. When the lid may be fixed in a substantially vertical alignment, e.g., by means of a stop, articles situated in the recess are consequently prevented from flying out in the event of a head-on collision of the vehicle. Thus, the lid in the present invention is a device for safeguarding the contents of the recess.

Because of the limited interior space of vehicles, there is often a lack of suitable surfaces for depositing cups or liquid-filled cans. In an advantageous refinement of the invention, it is therefore proposed to provide the recess with a holder, into which a cup or can may be placed. The diameter and depth of the holder are selected in accordance with the dimensions of cup and can in such a way that the latter are secured against horizontal displacement and overturning by virtue of being supported circumferentially or against at least one edge of the holder. In the simplest case, the holder therefore comprises a cylindrical indentation of the recess, which indentation has a diameter corresponding to the cup. Naturally, the recess may also comprise a plurality of holders, in particular one for each occupant of both adjacent seating locations.

Considerable design restrictions for the refinement of the holder arise from the fact that most of the head rest volume is taken up by the padding and so there is only a small amount of installation space available. In particular, it is generally not possible to introduce into the recess an indentation of sufficient depth to guarantee that cans and cups are held securely also in the moving state of the vehicle and under the vibrational conditions associated with said state.

For said reason, a support is proposed, which may be swivelled out of the recess and has a retaining ring or a retaining clip fastened thereto. The fastening of retaining ring or retaining clip to the support is effected preferably likewise in a rotatable manner. A cup or can may be inserted into the retaining ring or retaining clip, which is fixable vertically above the recess. To this end, the ring or clip has an opening, the dimensions of which correspond to the diameters of cup and/or can. Thus, overturning is reliably prevented even when the vehicle is vibrating. The support, when swivelled inwards, is notable for a low spatial requirement, particularly with regard to the shallow overall height. To simplify the design further, it is conceivable for a lid of the recess to form the support. Retaining rings or retaining clips may exclusively form the holder for cups or cans, which are suspended or resiliently clamped therein without touching the recess. Mostly, however, they are used as a safety element for cups or cans, which are deposited on a flat surface of the recess or a surface provided with an indentation, which facilitates the use of uniform holders for cups and cans of slightly differing dimensions. For the mutual fixing of retaining ring or clip, support and arm rest, many suitable detent devices are conceivable as well as stops, with an application against said stops being effected under the influence of a spring or gravitational force.

A further possible way to use the middle arm rest with head rest according to the invention is to dispose a display screen in the recess. Activation of the display screen may be effected by many different devices, e.g. a television, computer or traffic guidance system. In said case, it is also conceivable for a single display screen to serve as an output device of a plurality of devices. Thus, during travel the occupants of the back seat may relax, work or in the case of a traffic guidance system—follow the route on the display screen. Operator control elements, such as an on/off switch, for the display screen and optionally for devices for activating the latter are advantageously disposed likewise in the holder. The device for activating the display screen may however be situated at any desired point in the vehicle, e.g. in the middle arm rest or below or behind the back seat, wherein the connection and power supply of the display screen is effected preferentially by cable.

Because of the low height of the recess, an ideal option is to install, in particular, liquid-crystal or plasma display screens, which are notable for their low thickness. Given suitable dimensions, other designs of display screens are however also usable.

The display screen is preferably fastened pivotally in the recess so that it may be moved into an optimum position for the user. In such a manner, moreover, troublesome reflections on the display screen surface are avoidable through suitable adjustment. Swivelling may be effected either continuously through any desired angles or into preset detent positions which guarantee good fixing of the adjusted display screen position. It is also advantageous when the display screen is capable of swiveling about a plurality of axes, in particular when the display screen is rotatable both about a horizontal axis to vary its inclination and about a vertical axis to allow it to be directed towards a user situated laterally of the middle arm rest. To facilitate operation, use may be made of a switch which automatically activates the display screen when the display screen is swivelled out of the head rest. Finally, an advantageous refinement includes disposing the display screen on the inside, directed towards the recess, of a hinged lid. Thus, the display screen is swivelled out of the recess upon opening of the lid.

It is further proposed that the head rest is extendable out of the arm rest. Thus, when the middle of the back rest is occupied, the head rest may be displaced into the optimum position for protecting the passenger. On the other hand, when the middle arm rest is folded down, the head rest is adjustable in such a way as to bring the recess into a position comfortably within reach and/or a screen into an optimum viewing position.

The head rest is advantageously attached to the middle arm rest by means of rods, which in particular constitute a suitable extension guide. Since the back rests of bench seats are as a rule inclined relative to the vertical, the rods are preferably curved in such a way that the head rest is situated substantially vertically above the top edge of the back rest and therefore offers maximum protection to the passenger. In this case, the rods are curved in the direction of the seat surface and generally verge from a lower portion extending parallel to the back rest into an upper, substantially vertical portion.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
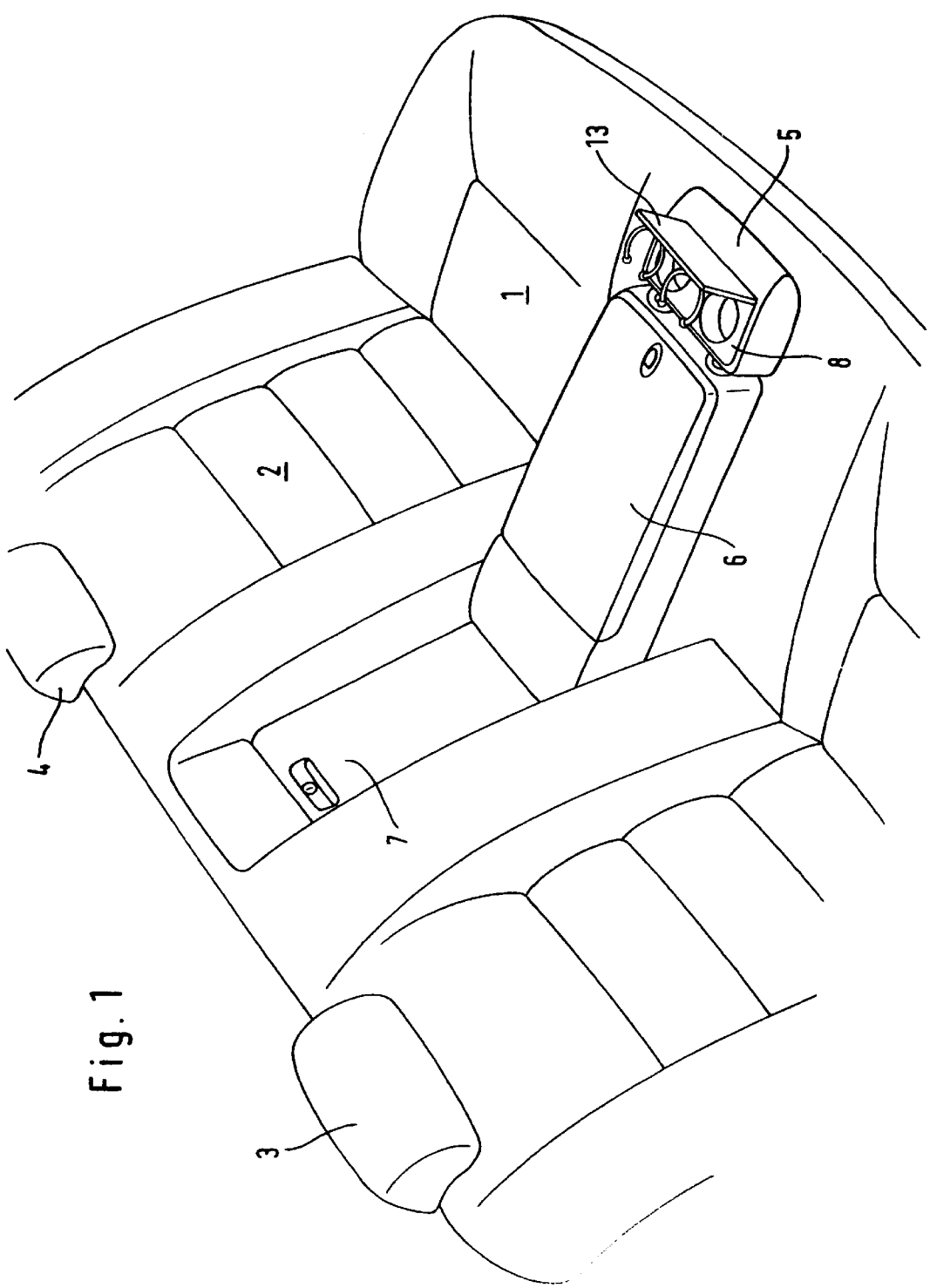
FIG. 1: is a perspective view of a vehicle bench seat with middle arm rest according to the invention.

Referring to the drawings in particular, FIG. 1 shows a view of a vehicle bench seat according to the invention comprising a seat surface 1 and a back rest 2. Above the top edge of the backrest 2, head rests 3, 4 are provided. The head rests 3, 4 are in the region of the two outer seat locations 2. The head rest 5 for the middle location is situated in between head rests 3 and 4. The head rest 5 is attached to the front end of the middle arm rest 6. The arm rest 6 may be swivelled between the illustrated, substantially horizontal position aligned parallel to the seat surface 1 and an approximately vertical position, in which it is disposed in such a manner in the recess 7 of the back rest 2 as to produce a smooth back rest surface. In the position providing the smooth back rest surface, the head rest 5 is situated above the back rest 2.

Figure 2:
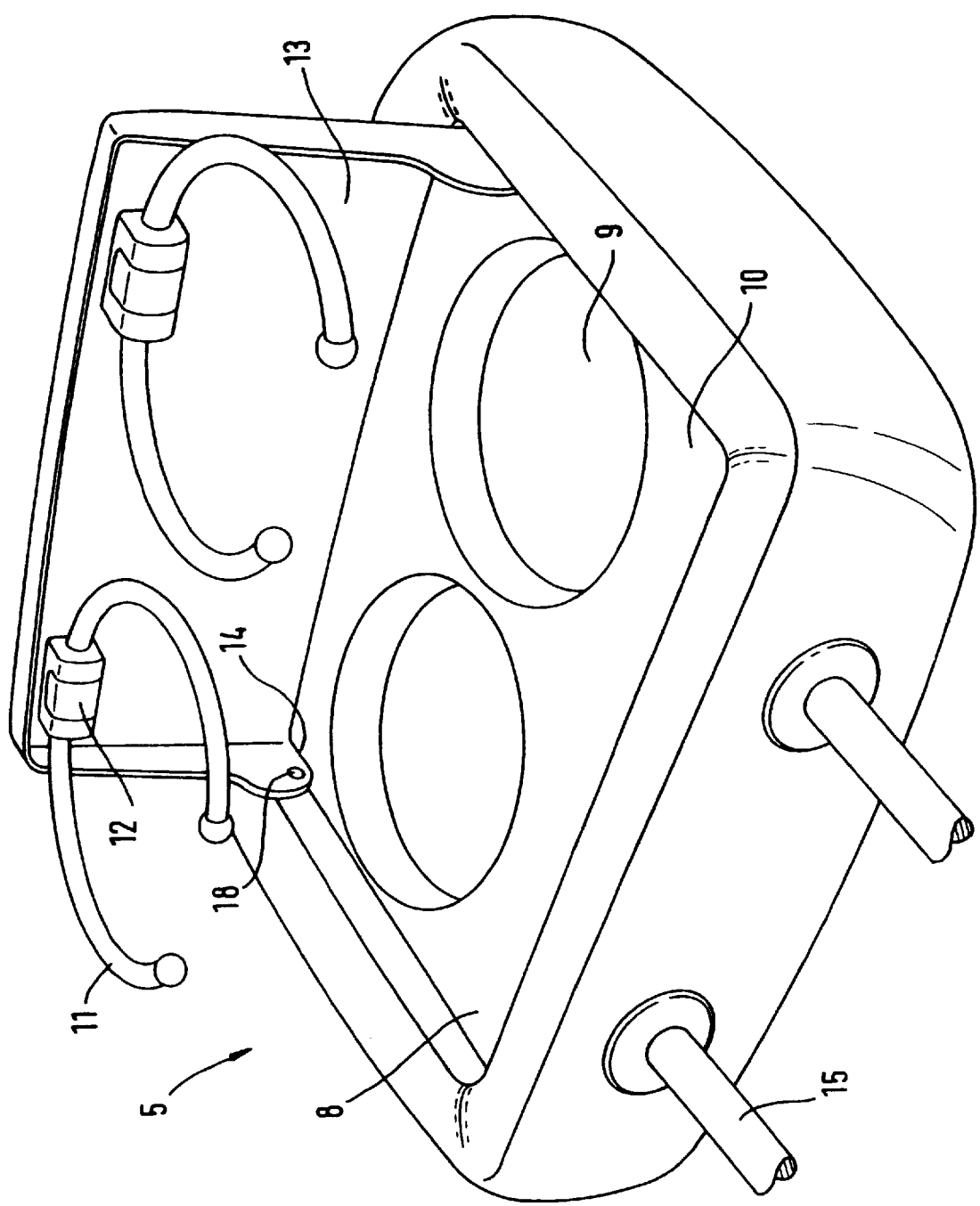
FIG. 2: is a perspective detail view of the head rest shown in FIG. 1, taken from a different angle.

To provide a suitable deposit facility for cups, the side of the head rest 5, which is at the top when the middle arm rest 6, is horizontally aligned and is provided with a recess 8. An enlarged view of the recess 8 is shown in FIG. 2. Indentations 9 are provided in the deposit surface 10 of the recess 8. The indentations 9 in cooperate with retaining clips 11 situated vertically above the indentations 9 to form a holder. The holder provides a structure into which cups or cans may be inserted. In the inserted state, the cups or cans are secured by the holder against horizontal displacement and overturning. The fastening of the retaining clip 11 is effected in a hinge 12 on the lid 13 of the recess 8. The lid 13 is fixed in the illustrated position by means of a stop 14. The retaining clips 11 are fixable, e.g., by means of an arresting device in the hinge 12 in such a way as to produce a secure support for cups. Rods 15 are used to fasten the bead rest 5 in a displaceable manner to the middle arm rest 6.

Figure 3:
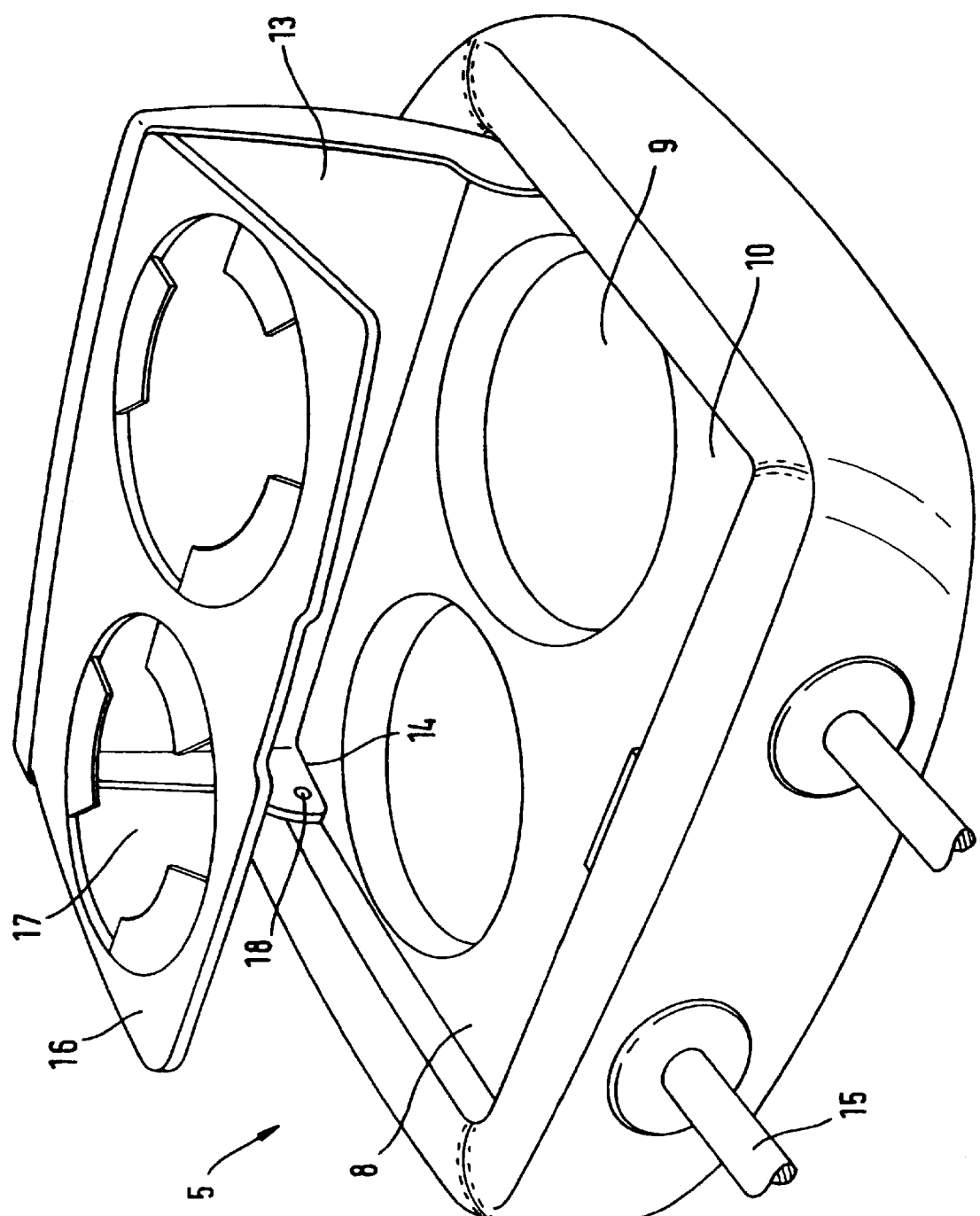
FIG. 3: is a perspective detail view of an alternative embodiment of the head rest.

FIG. 3 shows an alternative construction of the head rest 5, in which a plate 16 having openings 17 for fixing the caps is provided. After an arresting device has been released or a spring force surmounted, the plate 16 may in an identical manner to the previously described retaining clips 11 of the previously described construction be swivelled parallel to the lid 13, which in turn may be folded about the axis 18 into the head rest 5.

The result is therefore a cup holding device which is notable for its extremely low overall height, thereby allowing it to be fastened to the back of head rests 5, which may be swivelled with a middle arm rest 6.

Figure 4:
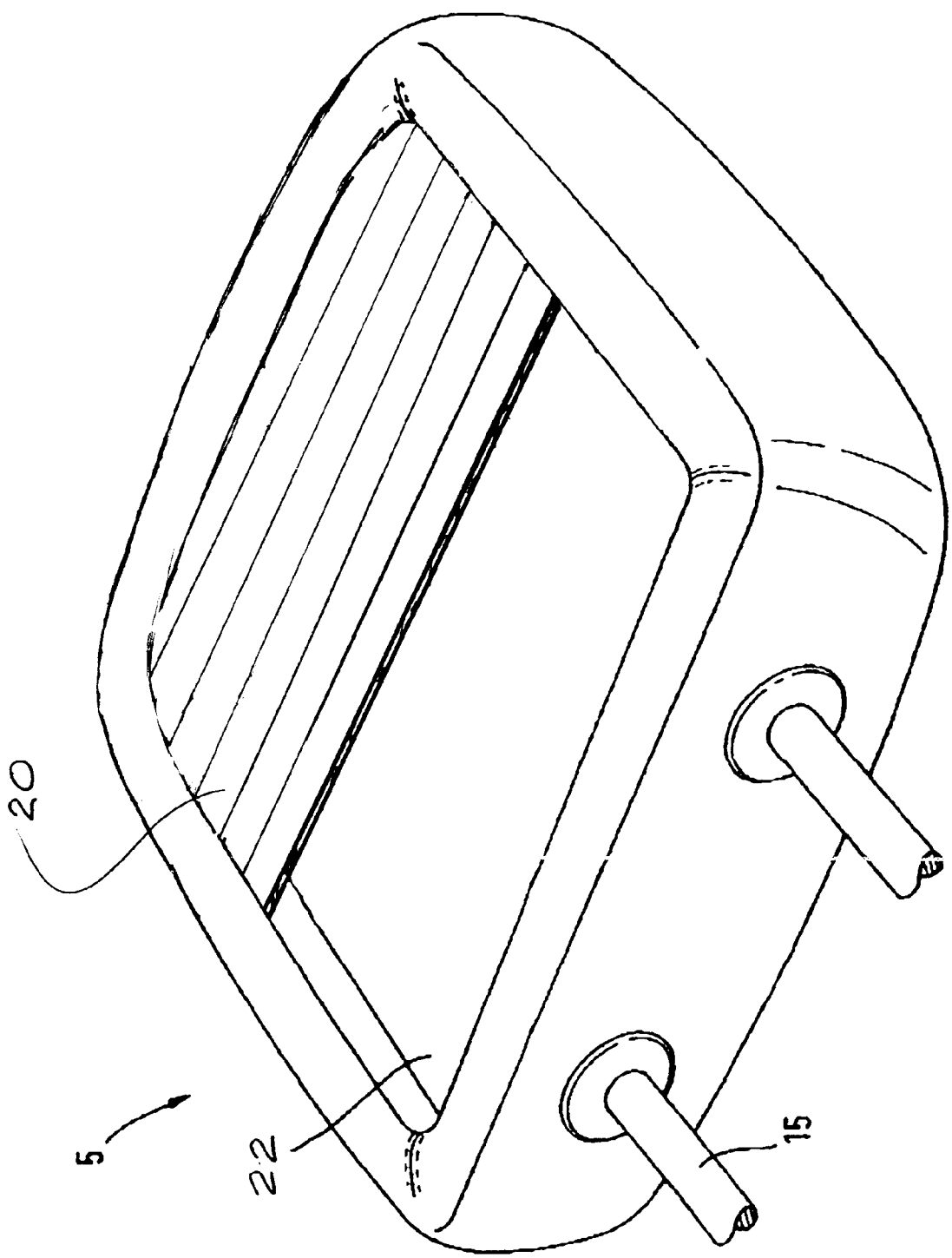
FIG. 4: is a perspective detail view of an alternative embodiment of the headrest.

As shown in FIG. 4 the recess 8 may be closed by a roller blind 20 instead of the lid 13 shown in FIGS. 1, 2 and 3. FIG. 4 also shows a display device 22 shown situated in the recess 8.

While specific embodiments of the invention have been shown and described in detail to illustrate the application of the principles of the invention, it will be understood that the invention may be embodied otherwise without departing from such principles.

What is claimed is:

1. A vehicle bench seat comprising:

a seat surface and back rest having a top edge;

a middle arm rest capable of swivelling between a substantially horizontal position parallel to the seat surface and a substantially vertical position, in which it is disposed in a recess of the back rest, said middle arm rest having a front end with a head rest, in said substantially vertical position of said arm rest, said head rest projecting above said top edge of said back rest, said head rest having a recess at a side of said head rest which forms a top side when said middle arm rest is in said substantially horizontal position; and a closure element closing the recess of the head rest to the outside, whereby said recess of the head rest is closable, said closure element comprising one of a lid and roller blind.

2. The vehicle bench seat according to claim 1, wherein said recess of the back rest is accessible from the top side of said middle arm rest.

3. A vehicle bench seat comprising:

a vehicle bench seat with a seat and a back rest having a top edge and an arm rest recess formed in said back rest;

a middle arm rest capable of swelling between a substantially horizontal position parallel to the seat surface and a substantially vertical position, in which said middle arm rest is disposed in said arm rest recess of the back rest, said middle arm rest having a top end adjacent to said top edge of said backrest;

a head rest connected to said top end of said middle arm rest, said head rest projecting above said top edge of said back rest with said middle arm rest in said substantially vertical position, said head rest having a recess at a side of said head rest which forms a top side when said middle arm rest is in said substantially horizontal position; and a closure element closing the recess of the head rest to the outside, whereby said recess of the head rest is closable.

4. A vehicle bench seat comprising:

a vehicle bench seat with a seat having an uninterrupted seat surface and with a back rest having a back surface with a top edge and with an arm rest recess formed in said back rest;

a middle arm rest pivotally connected to said vehicle bench seat for swivelling between a substantially horizontal position, parallel to the seat surface and a substantially vertical position, in which said middle arm rest is disposed in said arm rest recess of the back rest, said middle arm rest having a top end adjacent to said top edge of said backrest;

a head rest as a separate element from said middle arm rest, said head rest being connected to said top end of said middle arm rest, said head rest projecting above said top edge with said middle arm rest in said substantially vertical position, and said head rest being movable relative to said middle arm rest for adjusting the extent said head rest projects above said top edge with said middle arm rest in said substantially vertical position, said head rest having a recess at a side of said head rest which forms a top side when said middle arm rest is in said substantially horizontal position; and a closure element connected to said head rest, said closure element closing the recess of the head rest to the outside, whereby said recess of the head rest is closable.

5. The vehicle bench seat according to claim 1, wherein said lid includes means for swivelling the lid about an axis at the edge of the recess.

6. The vehicle bench seat according to claim 1, wherein said head rest includes means for extending said headrest with respect to said middle arm rest.

7. The vehicle bench seat according to claim 1, wherein said recess of the head rest is provided with a holder, said holder being adapted to receive one of a cup and a can so as to secure the one of a cup and a can against horizontal displacement and overturning.

8. The vehicle bench seat according to claim 7, further comprising a support including a connection for swivelling said support out of the recess of the head rest, said support having one of a retaining ring and a retaining clip fastened to said support, which is fixable vertically above said recess of the head rest to form a part of said holder into which said one of a cup and a can is insertable when the middle arm rest is in said substantially horizontal position.

9. The vehicle bench seat according to claim 8, wherein said support is a lid of said recess of the head rest.

10. The vehicle bench seat according to claim 8, wherein said one of a retaining ring and a retaining clip is fastened to the support via a connection so as to be capable of swivelling.

11. The vehicle bench seat according to claim 1, further comprising a display screen disposed in said recess.

12. The vehicle bench seat according to claim 11, wherein said display screen is one of a liquid-crystal and a plasma display screen.

13. The vehicle bench seat according to claim 11, wherein said display screen is fastened in said recess of the head rest so as to be capable of swivelling.

14. The vehicle bench seat according to claim 1, further comprising rods, wherein said head rest is fastened by said rods to said middle arm rest.

15. The vehicle bench seat according to claim 14, wherein said rods extend in said substantially vertical position of said middle arm rest to present a curvature in a direction of said seat surface.

\* \* \* \* \*

UNITED STATES PATENT AND TRADEMARK OFFICE
CERTIFICATE OF CORRECTION

PATENT NO. : 6,217,112 B1
DATED : April 17, 2001
INVENTOR(S) : Linsenmeier et al.

Page 1 of 1

It is certified that error appears in the above-identified patent and that said Letters Patent is hereby corrected as shown below:

<u>Title page,</u>
Item [54], should read -- VEHICLE BENCH SEAT WITH MIDDLE ARM REST AND HEAD REST --

Signed and Sealed this

Twenty-fifth Day of December, 2001

Attest:

*Attesting Officer*

JAMES E. ROGAN
*Director of the United States Patent and Trademark Office*